(No Model.)

L. W. WALKER.
COFFEE POT.

No. 277,813. Patented May 15, 1883.

WITNESSES:
W. W. Hollingsworth
W. Read

INVENTOR:
L. W. Walker
BY Munn & Co.
ATTORNEYS.

UNITED STATES PATENT OFFICE.

LEWIS W. WALKER, OF MINNEAPOLIS, MINNESOTA.

COFFEE-POT.

SPECIFICATION forming part of Letters Patent No. 277,813, dated May 15, 1883.

Application filed March 10, 1881. (No model.)

*To all whom it may concern:*

Be it known that I, LEWIS W. WALKER, of Minneapolis, in the county of Hennepin and State of Minnesota, have made certain new and useful Improvements in Coffee-Pots, of which the following is a full, clear, and exact description, reference being made to the accompanying drawings and letters of reference marked thereon, in which—

Figure 1:
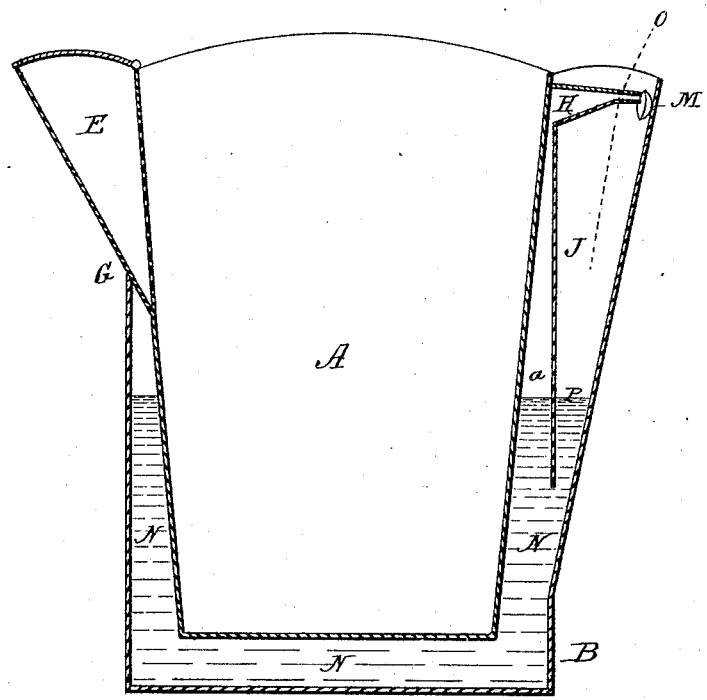
Figure 2:
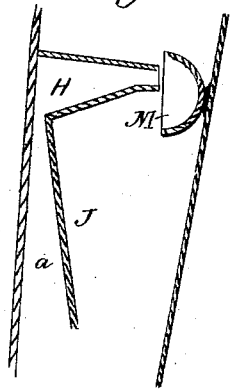

Figure 1 shows a vertical section of my improved coffee-pot with the handle and cover removed, and Fig. 2 is an enlarged detail sectional view.

My invention relates to improvements in that class of coffee-pots in which an inner vessel for the coffee is arranged within and concentric with an outer vessel, with a water-space between the vessels; and the object of my invention is to condense the steam formed in the water-jacket between the vessels in the process of making the coffee, and allow the water of condensation to flow back into the water-jacket, whereby I reduce the quantity of water necessary to be used in the water-reservoir, prevent its escape in the form of steam, and am enabled to use a smaller and lighter coffee-pot.

In the accompanying drawings, A represents the inner vessel for the coffee, and B the outer vessel, the former being arranged within and concentric with the outer vessel, B, of larger diameter, and the two vessels are soldered together along their upper edges, with a water-space, N, between them. An opening is made in the outer vessel for the spout E, communicating with the inner vessel, A, and secured thereto and also to the outer vessel at G.

J represents a feed-water pipe, open at its upper end, secured to the outer vessel, B, and communicating at its lower end with the water space or jacket N, whereby the latter is filled to the requisite height.

M represents a concave condensing-disk secured to the inside of the feed-water pipe J, near its upper end, and lying directly opposite the mouth of the steam-pipe H in the pipe J. The inner end of the steam-pipe H communicates by the passage *a* with the water-space N.

The coffee-pot is provided with the usual cover and handle. (Not shown in the drawings.)

In practice water is poured into the mouth O of the feed-water pipe J until the water-reservoir is filled to the height of the gage-point P, which can be seen by looking in at the top of the feed-pipe J. The coffee-pot is then placed on the fire, and when steam is produced in the water-space N it passes up the passage *a* to the steam-pipe H, thence through the latter, and is discharged against the concave disk M, which condenses the steam, the water of condensation flowing back into the water-space N. By thus continually condensing the steam arising from the water-space and allowing the water of condensation to flow back into the water-space, less water is required in the latter than if it were allowed to escape as steam, and the hot water in the reservoir will keep the coffee hot while being served, and there will be no danger of all the water in the reservoir being evaporated by boiling.

Having thus fully described my invention, what I claim as new, and desire to secure by Letters Patent, is—

The combination, with the inner and outer vessels, A B, having a water-space between them, of the feed-water pipe J, steam-pipe H, and concave condensing-disk M, substantially as described, and for the purpose set forth.

LEWIS WILLARD WALKER.

Witnesses:
JOHN H. HORTON,
JAMES A. SMITH.